US007929631B2

(12) United States Patent
Onggosanusi et al.

(10) Patent No.: US 7,929,631 B2
(45) Date of Patent: Apr. 19, 2011

(54) MULTIPLE SPACE TIME TRANSMIT DIVERSITY COMMUNICATION SYSTEM WITH SELECTED COMPLEX CONJUGATE INPUTS

(75) Inventors: Eko N. Onggosanusi, Dallas, TX (US); Anand G Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 2163 days.

(21) Appl. No.: 10/131,742

(22) Filed: Apr. 22, 2002

(65) Prior Publication Data
US 2003/0026349 A1   Feb. 6, 2003

Related U.S. Application Data

(60) Provisional application No. 60/285,669, filed on Apr. 23, 2001.

(51) Int. Cl.
*H04B 7/02* (2006.01)
*H04L 1/02* (2006.01)

(52) U.S. Cl. ........ 375/267; 375/259; 375/260; 375/299; 375/347

(58) Field of Classification Search .............. 375/276, 375/144, 147, 148, 262, 295, 316, 340, 346, 375/347, 349, 130, 140, 259, 260, 261, 141, 375/267, 299; 455/13.3; 370/204, 335, 441, 370/479, 203, 310, 328, 329, 431, 464
See application file for complete search history.

(56) References Cited

U.S. PATENT DOCUMENTS

| 5,010,558 | A  | * | 4/1991  | Yost et al. ............... 375/259 |
| 5,940,402 | A  | * | 8/1999  | Krakovyak ............... 370/461 |
| 6,178,196 | B1 | * | 1/2001  | Naguib et al. ............ 375/148 |
| 6,317,411 | B1 | * | 11/2001 | Whinnett et al. .......... 370/204 |
| 6,473,467 | B1 | * | 10/2002 | Wallace et al. ............ 375/267 |
| 6,519,296 | B1 | * | 2/2003  | Hladik ..................... 375/325 |
| 6,661,856 | B1 | * | 12/2003 | Calderbank et al. ....... 375/347 |
| 6,834,043 | B1 | * | 12/2004 | Vook et al. ............... 370/310 |
| 6,891,897 | B1 | * | 5/2005  | Bevan et al. .............. 375/265 |
| 7,050,510 | B2 | * | 5/2006  | Foschini et al. ........... 375/299 |
| 7,072,410 | B1 | * | 7/2006  | Monsen .................... 375/260 |

OTHER PUBLICATIONS

Esmailzadeh, Riaz, Doi, Nobukazu, A Comparison on the Performance of the FDD and TDD Modes of B-CDMA Communications, Nov. 6-10, 1995, IEEE, Universal Personal Communications. 1995 Record., 1995 Fourth IEEE International Conference, 339-343.*
John G. Proakis, Digital Communications, 2000, McGraw Hill, Thomas Casson, fourth edition, pp. 494-500.*

* cited by examiner

*Primary Examiner* — Curtis B Odom
(74) *Attorney, Agent, or Firm* — Ronald O. Neerings; Wade James Brady, III; Frederick J. Telecky, Jr.

(57) ABSTRACT

A transmitter comprising circuitry (14) for converting input bits to a plurality of symbols; and circuitry ($24_x$) for forming a complex conjugate of signals corresponding to selected ones of the plurality of symbols. The selected ones of the plurality of symbols consist of signals corresponding to some and less than all the plurality of symbols. The transmitter also comprises circuitry ($28_x$) for space time encoding both the signals corresponding to the selected ones of the plurality of symbols and signals corresponding to non-selected ones of the plurality of symbols. Lastly, the transmitter comprises a plurality of transmit antennas ($TAT_x$) coupled to transmit signals in response to the circuitry for space time encoding.

43 Claims, 3 Drawing Sheets

MULTIPLE SPACE TIME TRANSMIT DIVERSITY COMMUNICATION SYSTEM WITH SELECTED COMPLEX CONJUGATE INPUTS

CROSS-REFERENCES TO RELATED APPLICATIONS

This application claims the benefit, under 35 U.S.C. §119 (e)(1), of U.S. Provisional Application No. 60/285,669, filed Apr. 23, 2001, and incorporated herein by this reference.

STATEMENT REGARDING FEDERALLY SPONSORED RESEARCH OR DEVELOPMENT

Not Applicable.

BACKGROUND OF THE INVENTION

The present embodiments relate to wireless communications systems and, more particularly, to a multiple space time transmit diversity encoded wireless communication system.

Wireless communications are prevalent in business, personal, and other applications, and as a result the technology for such communications continues to advance in various areas. One such advancement includes the use of spread spectrum communications, including that of code division multiple access ("CDMA") which includes wideband code division multiple access ("WCDMA") cellular communications. In CDMA communications, a user station (e.g., a hand held cellular phone) communicates with a base station, where typically the base station corresponds to a "cell." CDMA communications are by way of transmitting symbols from a transmitter to a receiver, and the symbols are modulated using a spreading code which consists of a series of binary pulses. The code runs at a higher rate than the symbol rate and determines the actual transmission bandwidth. In the current industry, each piece of CDMA signal transmitted according to this code is said to be a "chip," where each chip corresponds to an element in the CDMA code. Thus, the chip frequency defines the rate of the CDMA code. WCDMA includes alternative methods of data transfer, one beoing frequency division duplex ("FDD") and another being time division duplex ("TDD"), where the uplink and downlink channels are asymmetric for FDD and symmetric for TDD. Another wireless standard involves time division multiple access ("TDMA") apparatus, which also communicate symbols and are used by way of example in cellular systems. TDMA communications are transmitted as a group of packets in a time period, where the time period is divided into slots (i.e., packets) so that multiple receivers may each access meaningful information during a different part of that time period. In other words, in a group of TDMA receivers, each receiver is designated a slot in the time period, and that slot repeats for each group of successive packets transmitted to the receiver. Accordingly, each receiver is able to identify the information intended for it by synchronizing to the group of packets and then deciphering the time slot corresponding to the given receiver. Given the preceding, CDMA transmissions are receiver-distinguished in response to codes, while TDMA transmissions are receiver-distinguished in response to time slots.

Since CDMA and TDMA communications are along wireless media, then the travel of those communications can be affected in many ways, and generally these effects are referred to as the channel effect on the communication. For example, consider a transmitter with a single antenna transmitting to a receiver with a single antenna. The transmitted signal is likely reflected by objects such as the ground, mountains, buildings, and other things that it contacts. In addition, there may be other signals that interfere with the transmitted signal. Thus, when the transmitted communication arrives at the receiver, it has been affected by the channel effect. Consequently, the originally-transmitted data is more difficult to decipher due to the added channel effect. Various approaches have been developed in an effort to reduce or remove the channel effect from the received signal so that the originally-transmitted data is properly recognized. In other words, these approaches endeavor to improve signal-to-noise ratio ("SNR"), thereby improving other data accuracy measures (e.g., bit error rate ("BER"), frame error rate ("FER"), and symbol error rate ("SER")). Several of these approaches are discussed below.

One approach to improve SNR is referred to in the art as antenna diversity, which refers to using multiple antennas at the transmitter, receiver, or both. For example, in the prior art, a multiple-antenna transmitter is used to transmit the same data on each antenna where the data is manipulated in some manner differently for each antenna. One example of such an approach is space-time transmit diversity ("STTD"). In STTD, a first antenna transmits a block of two input symbols over a corresponding two symbol intervals in a first order while at the same time a second antenna transmits, by way of example, the complex conjugates of the same block of two symbols and wherein those conjugates are output in a reversed order relative to how they are transmitted by the first antenna and the second symbol is a negative value relative to its value as an input. To illustrate this operation, consider the block of two symbols s(0) and s(1) at respective symbol intervals n for (n=0) and (n=1). This block is input to an STUD encoder, which over two symbol intervals outputs those symbols in the following streams 1 and 2 to its respective transmit antennas 1 and 2:

| Antenna 1: | s(0) | s(1) | stream 1 |
| Antenna 2: | −s(1)* | s(0)* | stream 2 |

Accordingly, there is some redundancy in the sense that a symbol transmitted by one transmit antenna is also transmitted in another form along a different transmit antenna for the same transmitter. The approach of using more than one transmit antenna at the transmitter is termed transmit antenna diversity. Further, note that in the STTD system the transmitted signals are in terms of blocks of symbols (or symbol samples) such as a block of two symbols in the preceding example, as opposed to single sequential symbols. This transmission of signals including such blocks is sometimes referred to as time diversity because each block of symbols represents a period of more than one symbol time. Also, where time diversity is combined with multiple transmit antennas such as in the example of an STTD system, then such a system is sometimes referred to as providing space time encoding.

Another approach to improve SNR combines antenna diversity with the need for higher data rate. Specifically, a multiple-input multiple-output ("MIMO") system with transmit diversity has been devised, where each transmit antenna transmits a distinct and respective data stream. In other words, in a MIMO system, each transmit antenna transmits symbols that are independent from the symbols transmitted by any other transmit antennas for the transmitter and, thus, there is no redundancy either along a single or with respect to multiple of the transmit antennas. The advantage of a MIMO scheme using distinct and non-redundant streams is that it can achieve higher data rates as compared to a transmit diversity system.

While the preceding approaches provide steady improvements in wireless communications, the present inventors recognize that still further improvements may be made, including by addressing some of the drawbacks of the prior art. As one example of a drawback, while the STTD system provides transmit antenna diversity, there is still redundancy in that the same symbol is transmitted, albeit in different forms, on each transmit antenna, thereby reducing the effective symbol rate of the transmitter relative to the MIMO system that transmits independent symbols on each of its transmit antennas. However, the STTD system provides orthogonal signals as between the redundant signals on different transmit antennas, and this orthogonality prevents the signals on different antennas from interfering with one another; in contrast, the MIMO system does not provide such orthogonality and, as a result, spatial interference may occur. Indeed, to address some of these issues, the present inventors described a multiple space time encoded system in co-pending U.S. patent application Ser. No. 10/107,275, filed Mar. 26, 2002, entitled, "Space Time Encoded Wireless Communication System", and hereby incorporated herein by reference. In this referenced application, multiple independent streams of data are connected to corresponding multiple independent space time encoders; each space time encoder then provides, in one embodiment, orthogonal output symbols in response to its input stream, while bandwidth is improved because at the same time an independent stream is also encoded and output by another space time encoder in a comparable manner. Further, a receiver is provided that decodes the transmitted signals including the multipaths therein. While this improvement therefore provides various benefits as discussed in the referenced application, the inventors also recognize still additional benefits that may be achieved with such systems. Accordingly, the preferred embodiments described below are directed toward these benefits as well as improving upon the prior art.

BRIEF SUMMARY OF THE INVENTION

In the preferred embodiment, there is a wireless transmitter. The transmitter comprises circuitry for converting input bits to a plurality of symbols; and circuitry for forming a complex conjugate of signals corresponding to selected ones of the plurality of symbols. The selected ones of the plurality of symbols consist of signals corresponding to some and less than all the plurality of symbols. The transmitter also comprises circuitry for space time encoding both the signals corresponding to the selected ones of the plurality of symbols and signals corresponding to non-selected ones of the plurality of symbols. Lastly, the transmitter comprises a plurality of transmit antennas coupled to transmit signals in response to the circuitry for space time encoding.

In another embodiment, there is a wireless receiver. The receiver comprises a plurality of receive antennas coupled to receive a plurality of space time encoded signals transmitted by a transmitter. The receiver also comprises circuitry for estimating a channel effect between the transmitter and the receiver in response to pilot values in at least some of the received plurality of space time encoded signals. Lastly, the receiver comprises circuitry for forming space time decoded signals by space time decoding the received plurality of space time encoded signals in response to the channel effect, and wherein the circuitry for forming space time decode signals comprises circuitry for forming a complex conjugate of selected ones of signals corresponding to the received plurality of space time encoded signals, the selected ones consisting of some and less than all of the received plurality of space time encoded signals.

Other devices, systems, and methods are also disclosed and claimed.

DETAILED DESCRIPTION OF THE INVENTION

The preferred embodiments provide wireless multiple space-time transmit diversity ("STTD") encoded transmissions of symbols from a transmitter to a receiver, and the receiver receives signals in response to the transmissions and operates to produce estimates of the transmitted symbols from these signals. These embodiments may be implemented in various forms, where by way of example the variations may include different wireless data formats. As an illustration of this scope, therefore, the following illustrates a code division multiple access ("CDMA") implementation, while one skilled in the art should appreciate that the inventive teachings also may apply, by way of example, to time division multiple access ("TDMA") implementations. Improved data rate and signal processing efficiency are achieved by transmitting across corresponding multiple sets of transmission antennas while taking an additional conjugate of selected symbols prior to STTD encoding. These aspects are further described below.

Figure 1:
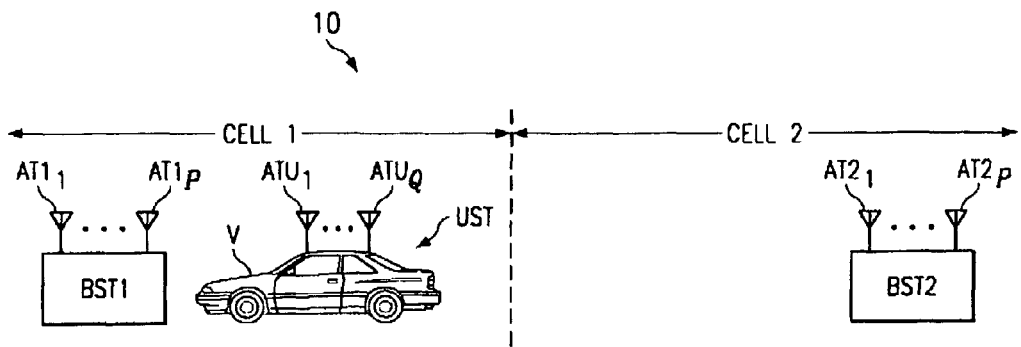
FIG. 1 illustrates a diagram of a cellular communications system by way of a CDMA example in which the preferred embodiments may operate.

FIG. 1 illustrates a diagram of a cellular communications system 10 by way of a CDMA example in which the preferred embodiments may operate. Within system 10 are shown two base stations BST1 and BST2. Each base station BST1 and BST2 includes a respective set of P transmit antennas $AT1_1$ through $AT1_P$ and $AT2_1$ through $AT2_P$ through which each station may transmit or receive wireless signals. The general area of intended reach of each base station defines a corresponding cell; thus, base station BST1 is intended to generally communicate with cellular devices within Cell 1, while base station BST2 is intended to generally communicate with cellular devices within Cell 2. Of course, some overlap between the communication reach of Cells 1 and 2 exists by design to support continuous communications should a communication station move from one cell to the other. Indeed, further in this regard, system 10 also includes a user station UST, which is shown in connection with a vehicle V to demonstrate that user station UST is mobile. User station UST includes Q multiple antennas $ATU_1$ through $ATU_Q$ for both transmitting and receiving cellular communications. Lastly, one skilled in the art should appreciate that insofar as system 10 and the preferred embodiments apply to various CDMA systems, they also apply to WCDMA systems which are a type of CDMA system.

In some respects, system 10 may operate according to known general techniques for various types of cellular or other spread spectrum communications, including CDMA and TDMA communications. Such general techniques are known in the art and include the commencement of a call from user station UST and the handling of that call by either or both of base stations BST1 and BST2. Where system 10 differs from the prior art, however, is the system for, and method of, selectively forming complex conjugates of symbols and then communicating multiple space time encoded signals from each of the set of base station antennas (e.g., $AT1_1$ through $AT1_P$) to user station UST as well as the receipt and processing of those communications to provide acceptable symbol estimation. These aspects are further detailed below in connection with FIGS. 2 through 4.

Figure 2:
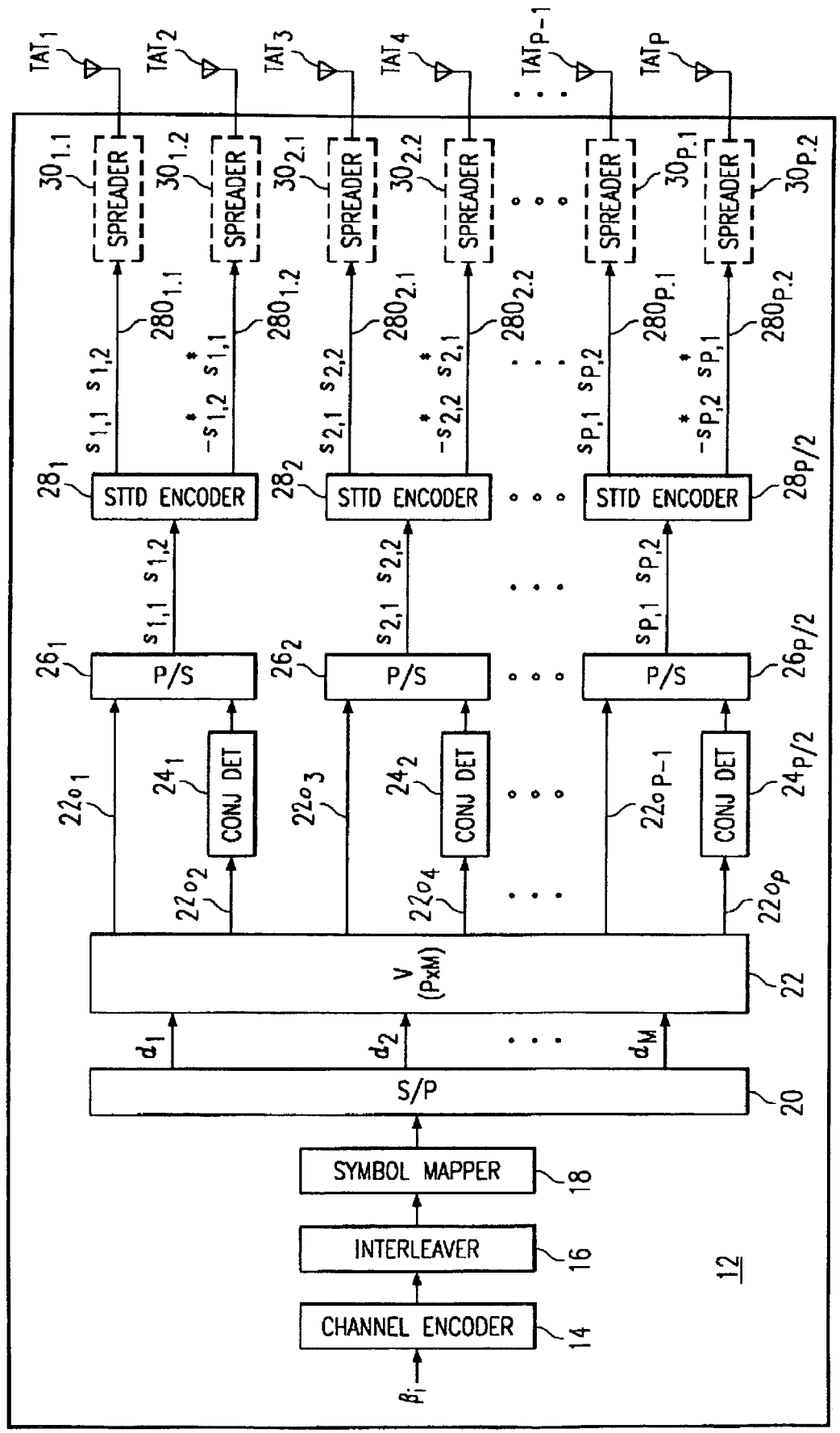
FIG. 2 illustrates an electrical and functional block diagram of a transmitter that may be used in either or both of base stations BST1 and BST2 in FIG. 1.

FIG. 2 illustrates an electrical and functional block diagram of a transmitter 12 that, by way of example, may be used in either or both of base stations BST1 and BST2 in FIG. 1 with a receiver described later that may be used as user station UST; however, such an arrangement is only by way of example and indeed, the alternative where transmitter 12 is at a user station and the later-described receiver is at a base station is also contemplated within the present inventive scope. In any event, as FIG. 2 represents an electrical and functional block diagram, one skilled in the art may ascertain various technical manners of implementing transmitter 12 using a combination of hardware and software, including the preferred used of a digital signal processor to include at least some of the illustrated blocks. Turning then to transmitter 12, it includes functional blocks 14 through 20 that are now described, with it understood that generally these blocks perform functions known in the art, with the overall function and combination of transmitter 12, including these blocks, being improved based on additional functional blocks described below. Transmitter 12 receives information bits $B_i$ at an input to a channel encoder 14, which encodes the information bits $B_i$ in an effort to improve raw bit error rate. Various encoding techniques may be used by channel encoder 14 and as applied to bits $B_1$, with examples including the use of convolutional code, block code, turbo code, concatenated codes, or a combination of any of these codes. The encoded output of channel encoder 14 is coupled to the input of an interleaver 16. Interleaver 16 operates with respect to a block of encoded bits and shuffles the ordering of those bits so that the combination of this operation with the encoding by channel encoder 14 exploits the time diversity of the information. For example, one shuffling technique that may be performed by interleaver 16 is to receive bits in a matrix fashion such that bits are received into a matrix in a row-by-row fashion, and then those bits are output from the matrix to a symbol mapper 18. Symbol mapper 18 converts its input bits to symbols, designated generally as $d_i$. The converted symbols $d_i$ may take various forms, such as quadrature phase shift keying ("QPSK") symbols, binary phase shift keying ("BPSK") symbols, or quadrature amplitude modulation ("QAM") symbols. In any event, symbols $d_i$ may represent various information such as user data symbols, pilot symbols, and control symbols such as transmit power control ("TPC") symbols and rate information ("RI") symbols. Symbols $d_i$ are coupled to a serial-to-parallel converter 20. Serial-to-parallel converter 20 receives incoming symbols and outputs a number P of these symbols in parallel along its outputs, where as also described later transmitter 12 includes the number P of transmit antennas.

The independent parallel symbol streams from serial-to-parallel converter 20 are connected as inputs to a matrix multiplication block 22. Matrix multiplication block 22 performs a linear transformation on its inputs by multiplying the signals d from serial-to-parallel converter 20 times a linear transformation matrix V, where V has a matrix dimension of P×M. Thus, block 22 outputs P outputs shown as $22o_1$ through $22o_P$. Accordingly, the outputs of matrix multiplication block 22 may generally be represented as a vector s of dimension P×1, and its signal relationship may be represented as shown in the following Equation 1:

$$s=VD, d=[d_1 d_2 \ldots d_M]^T \qquad \text{Equation 1}$$

The linear transformation matrix V can be computed either at transmitter 12 or at a receiver discussed later, depending on system constraints. For example, in TDD systems which have symmetric data transfer rates (and hence approximately symmetric channels), the basis matrix V can be computed at transmitter 12 (and also the receiver if necessary), whereas in FDD systems, which have asymmetric transfer rates, the matrix V may be computed at the receiver and then signaled to transmitter 12 via a wireless feedback channel. In any event, preferably the values of the matrix V are chosen in response to the channel effect between transmitter 12 and a receiver so as to allow the linear transformation imposed by matrix multiplication block 22 to reduce the effects of that channel on the communication between transmitter 12 and a receiver. Various other details and alternatives regarding the development of the matrix V are discussed later.

The connections of the outputs from matrix multiplication block 22 are now explored. Every output with an odd numbered subscript is connected directly to a respective parallel-to-serial converter $26_x$, where the number of parallel-to-serial converters equals one-half the number of transmit antennas, P. For example, output $22o_1$ is connected to parallel-to-serial converter $26_1$, output $22o_3$ is connected to parallel-to-serial converter $26_2$, and so forth through output $22o_{P-1}$ which is connected to parallel-to-serial converter $26_{P/2}$. Returning to matrix multiplication block 22, every output with an even numbered subscript is connected to a corresponding complex conjugate determination block $24_x$ which, as its name suggests, determines the complex conjugate of its input and that conjugate is provided at its output. For example, output $22o_2$ is connected to complex conjugate determination block $24_1$, output $22o_4$ is connected to complex conjugate determination block $24_2$, and so forth through output $22o_P$ which is connected to complex conjugate determination block $24_{P/2}$. Finally, each complex conjugate determination block $24_x$ provides its output to a parallel-to-serial converter $26_x$, having the same subscript as the complex conjugate determination block; thus, the output of complex conjugate determination block $24_1$ is connected to parallel-to-serial converter $26_1$, the output of complex conjugate determination block $24_2$ is connected to parallel-to-serial converter $26_2$, and finally the output of complex conjugate determination block $24_{P/2}$ is connected to parallel-to-serial converter $26_P$. From the preceding, therefore, one skilled in the art will appreciate that each parallel-to-serial converter $26_x$ receives one input that is only transformed by V and another input that is both transformed by V and for which the complex conjugate is formed. In other words, the complex conjugate of only a selected subset of all the transmitted symbols is formed prior to STTD encoding. In response, the corresponding parallel-to-serial converter $26_x$ serializes these parallel and varying types of inputs into a stream of symbol signals. For sake of convention, these symbol signals are shown to have two subscripts $s_{d,e}$ where d identifies the transmit antenna p along which the signal is ultimately transmitted (after additional processing) and e indicates a symbol time interval in which the signal is transmitted. For example, and with respect to transmission along transmit antennas $TAT_1$, looking at the output of parallel-to-serial converter $26_1$, during a first symbol interval it provides $s_{1,1}$ which represents the symbol provided directly from output $22o_1$ of matrix multiplication block 22, and during a second symbol interval it provides $s_{1,2}$ which represents the symbol from output $22o_2$ of matrix multiplication block 22 after its complex conjugate has been formed by complex conjugate determination block $24_1$. Accordingly, in the present and preferred embodiment, for each serial stream output of two symbols from parallel-to-serial converter $26_1$, one of those symbols is linearly transformed while the other is both linearly transformed and its complex conjugate is formed. The reasons for this pattern of alternating symbol complex conjugate formation are detailed later.

The output of each parallel-to-serial converter $26_x$ is connected to a corresponding STTD encoder $28_x$. Each STTD encoder $28_x$ operates as known in the art, but the preferred embodiment departs from the prior art in that, as shown above, every other one of the STTD encoder inputs are modified in the sense that it represents a complex conjugate of a previously provided symbol, thereby producing advantageous results described later. To illustrate the operation of STTD encoder $28_x$, the output signals of STTD encoder $28_1$ are shown as stream 3 and 4 below by way of example, relative to the input stream of $s_{1,1}$ and $s_{1,2}$, and along outputs $28o_{1.1}$ and $28o_{1.2}$.

| output $28o_{1.1}$: | $s_{1,1}$ | $s_{1,2}$ | stream 3 |
| output $28o_{1.2}$: | $-s_{1,2}{}^*$ | $s_{1,1}{}^*$ | stream 4 |

Each output of each STYD encoder $28_x$ is connected, in a CDMA embodiment, to a corresponding spreader $30_{x1}$ or $30_{x.2}$. Looking by way of example to STTD encoder $28_1$, its output $28o_{11}$ is connected to a spreader $30_{11}$ and its output $28o_{12}$ is connected to a spreader $30_{12}$. Alternatively, in a TDMA embodiment, those outputs are connected directly to respective transmit antennas $TAT_1$ and $TAT_2$ (via a digital-to-analog interface, not shown). Due to these alternatives, each spreader $30_{x.1}$ or $30_{x.2}$ is shown within a dashed line block. Looking to the CDMA implementation and to spreader $30_{1.1}$ as an example of the operation of each spreader $30_{x.1}$ or $30_{x.2}$ it modulates each input data symbol by combining it with, or multiplying it times, a CDMA spreading sequence which can be a pseudo-noise ("PN") digital signal or PN code or other spreading codes (i.e., it utilizes spread spectrum technology), where the approach therefore may be a single or multicode approach. In a single code instance, the signals from each of the different outputs $28o_{1.1}$ and $28o_{1.2}$ are multiplied times the same code. In a multicode instance, each stream output $28o_{1.1}$ and $28o_{1.2}$ is further divided into ds streams. Each of those ds streams is multiplied times a different and orthogonal code in a given set of ds codes, and where the same set of ds codes is used for each of the different outputs $28o_{1.1}$ and $28o_{1.2}$. Further, for each set of ds streams corresponding to outputs $28o_{11}$ and $28o_{12}$, the resulting products following the code multiplication are summed and the sum is output to a respective one of antennas $TAT_1$ and $TAT_2$. Further, the outputs of spreader $30_{1.1}$ are connected to respective transmit antennas $TAT_1$ and $TAT_2$ via a digital-to-analog interface, not shown. From the above, therefore, note that spreader $30_{1.1}$ is optional in that it is implemented when transmitter 12 is to function as a CDMA transmitter, and it is not implemented when transmitter 12 is to function as a TDMA transmitter. In either event, the ultimate signals are connected, with or without spreading, to respective transmit antennas $TAT_1$ and $TAT_2$. Further, comparable connections and signal processing are achieved with respect to transmit antennas $TAT_3$ through $TAT_P$. Finally, having concluded the description of FIG. 2, note that transmitter 12 is referred to herein as a multiple STTD transmitter in that it includes more than one STTD encoder $28_x$, where in the present example each such STTD encoder provides outputs to two transmit antennas.

Figure 3:
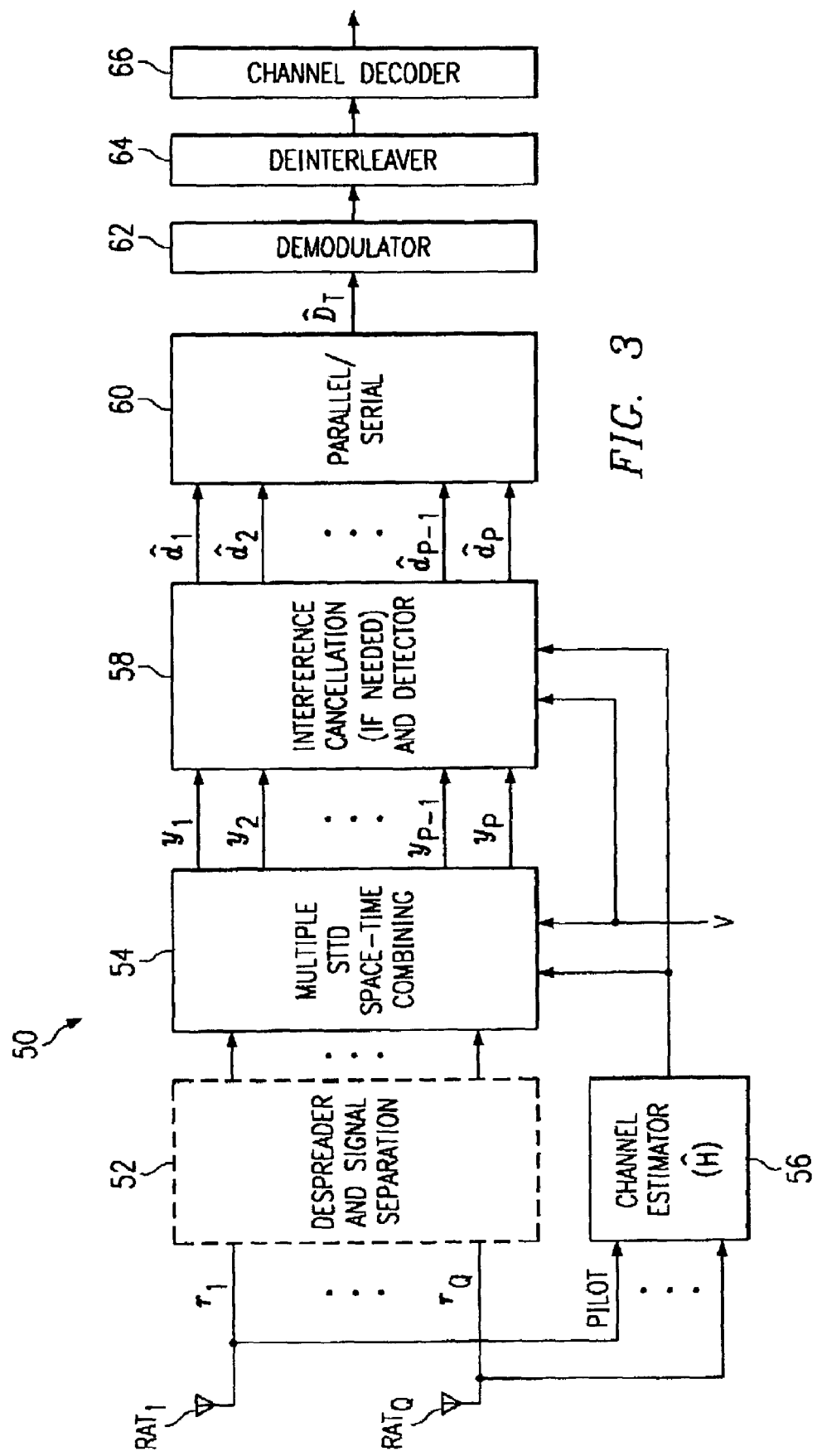
FIG. 3 illustrates an electrical and functional block diagram of a receiver for receiving communications from the transmitter of FIG. 2.

FIG. 3 illustrates an electrical and functional block diagram of a receiver 50 for receiving communications from transmitter 12, where receiver 50 therefore may function as user station UST in FIG. 1. As FIG. 3 represents an electrical and functional block diagram, one skilled in the art may ascertain various technical manners of implementing system receiver 50 using a combination of hardware and software, including the preferred used of a digital signal processor to include at least some of the illustrated blocks. Turning then to receiver 50, it includes a total number Q of receive antennas $RAT_1$ through $RAT_Q$, where those antennas in a CDMA embodiment are connected to a despreader 52 and in a TDMA embodiment they are connected directly to a multiple STTD space-time combining block 54 (with either connection being through an analog-to-digital interface, not shown). Again due to the alternatives including an option to exclude despreader 52, then it is shown within a dashed line block. Further, these options correspond to those stated above with respect to transmitter 12 in connection with its spreaders $30_{x.1}$ and $30_{x.2}$, that is, when the overall communication system including both transmitter 12 and receiver 50 is implemented as a CDMA system, then spreaders $30_{x.1}$ and $30_{x.2}$, and despreader 52 are included, whereas when that system is implemented as a TDMA system, then spreaders $30_{x.1}$ and $30_{x.2}$, and despreader 52 are not included. Still further, despreader 52 should accommodate the number of codes used by each of spreaders $30_{x.1}$ and $30_{x.2}$, where recall above there is discussed both a single code and multicode alternative and one skilled in the art may readily implement the corresponding despreading apparatus in despreader 52 based on which of these alternatives is implemented. In any event, let the signals received by receive antennas $RAT_1$ through $RAT_Q$ be indicated as $r_1$ through $r_Q$ with or without subsequent despreading; also for sake of convention, then any one of these signals for a given value of Q is represented as $r_q$ and the signals in their entirety may be represented as a vector r.

The signals $r_1$ through $r_Q$ are connected to multiple STTD space-time combining block 54. In the preferred embodiment, multiple STTD space-time combining block 54 multiplies the incoming signals times a matrix that represents a conjugate transpose of an estimate of the channel effect H, where H is detailed below, that exists between transmitter 12 and receiver 50; thus, block 54 multiplies times $\hat{H}^H$, where the value $\hat{H}$ designates the estimate of H and the superscript "H" identifies the Hermitian transpose (conjugate transpose) of that estimate; in addition, however, block 54 also multiplies times the complex conjugate transpose of V, where recall that V is imparted into the communicated signals by matrix multiplication block 22 of transmitter 12. Finally, and as illustrated later, multiple STTD space-time combining block 54 determines the complex conjugate for each signal corresponding to a symbol sample that was processed via a complex conjugate determination block $24_x$ in transmitter 12; thus, this function effectively reverses the effect of the formation of the complex conjugate of such a symbol by complex conjugate determination block $24_x$, yet note that each complex conjugate formed by a conjugate determination block $24_x$ was transmitted in a wireless channel in its complex conjugate form, thereby producing advantages detailed later. Concluding with respect to multiple STTD space-time combining block 54, by combining both multiplicand matrices $\hat{H}$ and V, it may be stated that block 54 produces outputs $y_1$ through $y_P$ in a vector y, where this operation is represented by the following Equation 2:

$$\underline{y} = V^H \hat{H}^H r = (\hat{H}V)^H r \qquad \text{Equation 2}$$

Further in connection with receiver 50 and Equation 2, receiver 50 also includes an input to receive the value of V where as indicated above the determination of V may be by either transmitter 12 or receiver 50. Further, the values of $\hat{H}$ as used by multiple STTD space-time combining block 54 are provided by a channel estimator 56, as detailed below.

In the preferred embodiment, receiver 50 also includes a channel estimator 56 that provides the values of $\hat{H}$ to multiple STYD space-time combining block 54. Specifically, channel estimator 56 receives the pilot symbols from receive antennas $RAT_1$ through $RAT_Q$, where these pilot symbols are typically communicated in a separate channel such as the known common pilot channel ("CPICH"). In such a case, the pilot symbols are spread by transmitter 12 with a code that differs from the code used to spread the data channel. Alternatively, pilot symbols could be included in the same channel as the data symbols in which case both the pilot and data symbols are spread with the same code. In either approach, therefore, the spreading of the pilot symbols requires a despreading operation at receiver 50, although for simplicity this operation is not shown and instead the pilot symbols are shown for illustration purposes as provided by receive antennas $RAT_1$ through $RAT_Q$. In response to the pilot symbols, channel estimator 56 determines the estimate $\hat{H}$ because the pilot symbols are known and, thus, any remaining non-noise effect in values of $r_1$ through $r_Q$ at a time t may be attributed to $\hat{H}$. Once $\hat{H}$ is determined by channel estimator 56, it is output to multiple STTD space-time combining block 54.

Returning to multiple STTD space-time combining block 54, its outputs provide the vector y to an interference cancellation and detector block 58, which also receive the values $\hat{H}$ and V as provided to multiple STTD space-time combining block 54. In some cases, each input $y_x$ to block 58 may be corrupted with interference from the other streams. Specifically, two signals transmitted via different transmit antennas but which originate from the same STTD encoder $28_x$ should not interfere with each other due to the orthogonality provided by STTD encoding. However, the stream of data into one STTD encoder such as encoder $28_1$ is independent of the stream into another such as encoder $28_2$, and these two streams will spatially interfere with one another. Accordingly, to suppress the effect of interference coming from signals provided by a different STTD encoder, then interference cancellation is preferred (unless not needed, as discussed later). If this is the case, then block 58 includes the interference cancellation aspect to provide the function, as its name suggests, to remove the interference that exists in $y_1$ through $y_P$, as it arose from the originally-independent transmitted symbols, thereby producing respective separated estimated symbols $\hat{d}_1$ through $\hat{d}_P$. Further in this regard, block 58 performs its function according to any one of various algorithms known in the art. At least the following approaches are contemplated for block 58 and include: (i) zero forcing or minimum mean square error ("MMSE"); (ii) 1-shot (i.e., linear) or iterative; (iii) 1-stage or multistage; and (iv) maximum likelihood detection. Certain of these techniques also may be combined, as is known, such as with a linear MMSE, an iterative MMSE, a linear zero forcing, and an iterative zero forcing. Moreover, one skilled in the art may contemplate other examples as well.

The estimated symbols $\hat{d}_1$ through $\hat{d}_P$ are output by interference cancellation and detector block 58 to the remaining circuitry in receiver 50, which may be constructed and operate according to known principles. Thus, these outputs are preferably connected to a parallel-to-serial converter 60, which converts the P parallel streams into a single total estimated symbol stream, $\hat{D}_T$. The estimated symbol stream is connected to a demodulator 62, which removes the modulation imposed on the signal by symbol mapper 18 of transmitter 12. The output of demodulator 62 is connected to a deinterleaver 64, which performs an inverse of the function of interleaver 16 of transmitter 12, and the output of deinterleaver 16 is connected to a channel decoder 66. Channel decoder 66 may include a Viterbi decoder, a turbo decoder, a block decoder (e.g., Reed-Solomon decoding), or still other appropriate decoding schemes as known in the art. In any event, channel decoder 66 further decodes the data received at its input, typically operating with respect to certain error correcting codes, and it outputs a resulting stream of decoded symbols. Indeed, note that the probability of error for data input to channel decoder 66 is far greater than that after processing and output by channel decoder 66. Finally, the decoded symbol stream output by channel decoder 66 may be received and processed by additional circuitry in receiver 50, although such circuitry is not shown in FIG. 3 so as to simplify the present illustration and discussion.

Having generally described transmitter 12, receiver 50, and the operation of both, attention is now directed to a discussion from which one skilled in the art should appreciate the additional benefits provided by the function of forming the complex conjugate of selected symbols prior to STTD encoding and transmission by transmitter 12 and then later taking the complex conjugate of those same selected symbols by receiver 50. To simplify the discussion, first an analysis is provided for a pair of STTD encoders $28_x$, with each connected to provide signals to two respective transmit antennas and where those signals are communicated as received along a single channel to one of the Q transmit antennas, and where as shown later such a discussion may be expanded to the more general case of P transmit antennas. Thus, looking to STTD encoder $28_1$, recall that its two streams of outputs for two successive symbol time intervals are shown as streams 3 and 4, above, and are repeated here for the convenience of the reader:

| | | | |
|---|---|---|---|
| output $28o_{1.1}$: | $s_{1,1}$ | $s_{1,2}$ | stream 3 |
| output $28o_{1.2}$: | $-s_{1,2}^*$ | $s_{1,1}^*$ | stream 4 |

Similarly, looking to STTD encoder $28_2$, one skilled in the art will appreciate that for the same two successive symbol time intervals, its outputs are as shown in the following streams 5 and 6:

| | | | |
|---|---|---|---|
| output $28o_{2.1}$: | $s_{2,1}$ | $s_{2,2}$ | stream 5 |
| output $28o_{2.2}$: | $-s_{2,2}^*$ | $s_{2,1}^*$ | stream 6 |

Given the outputs of STTD encoders $28_1$ and $28_2$, for a given receive antenna $RAT_q$ and at a time interval (n=0), the signal it receives may be written in the form of the following Equation 3:

$$r_q(0) = h_{q,1}s_{1,1} - h_{q,2}s^*_{1,2} + h_{q,3}s_{2,1} - h_{q,4}s^*_{2,2} + \omega_q(0) \qquad \text{Equation 3}$$

In Equation 3, for each factor $h_{q,m}$, the "h" indicates a channel effect, the subscript "q" indicates as received by the $q^{th}$ receive antenna $RAT_q$, and the subscript "m" indicates as provided by the transmitting antenna $TAT_m$. Also, the factor $\omega_q(0)$ represents the white noise in the received signal at the $q^{th}$ receive antenna $RAT_q$. Further, for the given receive antenna $RAT_q$ and at the time interval (n=1), and for now ignoring the effect of the previous formation of the complex conjugate of selected symbols by complex conjugate determination blocks $24_1$ and $24_2$, the signal it receives may be written in the form of the following Equation 4:

$$r_q(1) = h_{q,1}s_{1,2} + h_{q,2}s^*_{1,1} + h_{q,3}s_{2,2} + h_{q,4}s^*_{2,1} + \omega_q(1) \quad \text{Equation 4}$$

Equations 3 and 4 may be combined to describe the signal at the $q^{th}$ receive antenna in two consecutive symbol intervals, as shown in the following Equation 5:

$$[r_q(0) r_q(1)] = \sum_{k=1}^{2} [h_{q,2k-1} \; h_{q,2k}] \begin{bmatrix} s_{k,1} & s_{k,2} \\ -s^*_{k,2} & s^*_{k,1} \end{bmatrix} + [\omega_q(0) \omega_q(1)] \quad \text{Equation 5}$$

Given the preceding, the earlier-described aspect of the preferred embodiment is now explored in still additional detail, namely, the function of forming the complex conjugate of selected (e.g., for every other symbol time) symbols prior to STTD encoding. Specifically, in the previous example, recall that Equation 4 is directed to symbol time interval (n=1). Further, one skilled in the art will appreciate that the second column of the Equation 5 symbol matrix (i.e., the second column $$\begin{bmatrix} s_{k,1} & s_{k,2} \\ -s^*_{k,2} & s^*_{k,1} \end{bmatrix})$$

also corresponds to symbol time interval (n=1). Thus, to process the signals based on Equation 5 in an effort to recover the data symbols s based on the received signals r, considerable complexity is required in relating to this matrix, where that matrix also provides a non-linear relationship between the received signals r relative to the transmitted symbols s. In the preferred embodiments, however, the present inventors have recognized that this Equation 5 symbol matrix may be reduced to a vector by implementing conjugate determination blocks $24_x$ in transmitter 12. More particularly, because these blocks form the complex conjugates of the symbols of the same time interval (n=1), then this added functionality in effect replaces the second column in the symbol matrix of Equation 5 with the complex conjugates of those values. Thus, the Equation 5 symbol matrix takes the form of the following Equation 6:

$$\begin{bmatrix} s_{k,1} & s^*_{k,2} \\ -s^*_{k,2} & s^*_{k,1} \end{bmatrix} \quad \text{Equation 6}$$

By comparing the Equation 5 symbol matrix with the Equation 6 symbol matrix, the present inventors further observe that, with the exception of whether a symbol is positive or negative, then the Equation 5 symbol matrix has four distinct values (i.e., $s_{k,1}$; $s_{k,2}$; $s^*_{k,1}$; and $s^*_{k,2}$) while the Equation 6 symbol matrix includes only two distinct values (i.e., $s_{k,1}$ and $s^*_{k,2}$). As shown below, therefore, the non-linear relationship in Equation 5 can be converted, due to the additional formation of complex conjugates for symbol interval (n=1), into a linear expression, thereby reducing the number of variables involved in the signal processing and leading to numerous benefits known in the art that accompany such a reduction. These aspects are further examined below.

To further demonstrate the linear relationship achieved by the preferred embodiments as between the received signals and the transmitted symbols, first consider the following Equation 7 as developed from Equation 4:

$$r^*_q(1) = h^*_{q,1}s^*_{1,2} + h^*_{q,2}s_{1,1} + h^*_{q,3}s^*_{2,2} + h^*_{q,4}s_{2,1} + \omega_q(1) \quad \text{Equation 7}$$

Specifically, in the Equation 7, the complex conjugate of each element in the Equation 4 is provided, which is the effect imposed on this signal by complex conjugate determination blocks $24_1$ and $24_2$. In other words, recalling that complex conjugate determination blocks $24_1$ and $24_2$ form the complex conjugate for symbol time interval (n=1), then mathematically the effect thereof is shown in Equation 7.

Given Equation 7 and the fact that the Equation 6 symbol matrix includes only two distinct values (ignoring sign), then for the preferred embodiment the received signals can be written as in the following Equation 8:

$$\begin{bmatrix} r_q(0) \\ r^*_q(1) \end{bmatrix} = \sum_{k=1}^{2} \begin{bmatrix} h_{q,2k-1} & -h_{q,2k} \\ h^*_{q,2k} & h^*_{q,2k-1} \end{bmatrix} \begin{bmatrix} s_{k,1} \\ s^*_{k,2} \end{bmatrix} + \omega_q \quad \text{Equation 8}$$

Comparing Equation 8 with Equation 5, one skilled in the art will appreciate that in Equation 8 the terms relating to the symbols s have been reduced from a matrix in Equation 5 to a vector in Equation 8, thereby providing a linear relationship between the received vector signals r relative to the transmitted symbols s. As a result, there is a reduction in the complexity required to recover the data symbols s based on the received signals r. This benefit is further explored below.

The linear relationship in Equation 8 may be exploited by certain signal processing, where such processing is realized based on the form of Equation 8 as may be illustrated by defining the following terms in Equations 9 through 11, each of which corresponds to either a vector or matrix in Equation 8:

$$r_q = \begin{bmatrix} r_q(0) \\ r^*_q(1) \end{bmatrix} \quad \text{Equation 9}$$

$$H_{q,k} = \begin{bmatrix} h_{q,2k-1} & -h_{q,2k} \\ h^*_{q,2k} & h^*_{q,2k-1} \end{bmatrix} \quad \text{Equation 10}$$

$$s_k = \begin{bmatrix} s_{k,1} \\ s^*_{k,2} \end{bmatrix} \quad \text{Equation 11}$$

Further, the preceding Equations 8 through 11 may be expanded beyond the present example of two STTD encoders (i.e., four transmit antennas) so as to apply to any preferred embodiment having P/2 STTD encoders and P transmit antennas. In this regard, the following Equation 12 may be written:

$$r_q = [H_{q,1} \; H_{q,1} \; \ldots \; H_{q,1}] \begin{bmatrix} s_1 \\ s_2 \\ \vdots \\ s_{P/2} \end{bmatrix} \quad \text{Equation 12}$$

With respect to the symbol vector in Equation 12, let it be defined as s as shown in the following Equation 13:

$$s = \begin{bmatrix} s_1 \\ s_2 \\ \vdots \\ s_{P/2} \end{bmatrix} \quad \text{Equation 13}$$

Next, by stacking all values of $r_q$ for q=1 through q=Q (i.e., $\{r_q\}_{q=1}^Q$) into a vector r have a dimension of (2Q)×1, and by creating a channel effect matrix H for all values of Q to thereby drop the value of q from the subscript leaving only the value from 1 to P/2 in the subscript, then Equation 12 can be written as in the following Equation 14:

$$r = [H_1 H_2 \ldots H_{P/2}]s + w \quad \text{Equation 14}$$

Further, let an overall effective channel matrix H be defined as in the following Equation 15 for the channel effect matrices in Equation 14:

$$H = [H_1 H_2 \ldots H_{P/2}] \quad \text{Equation 15}$$

In Equation 15, therefore, the matrix H is of dimension 2Q×P and has complex elements.

Given the preceding, the analysis in combination with the preferred embodiment function of selectively forming complex conjugates of certain symbols using conjugate determination blocks $24_x$ therefore permits Equation 14 to be re-written, using the definition from Equation 15, into the form of the following Equation 16.

$$r = Hs + w \quad \text{Equation 16}$$

The form of Equation 16, as known in the art, therefore lends itself to the generation of sufficient statistics for symbol detection using various known approaches, such as maximum ratio combining ("MRC") or space-time RAKE combining. This can be implemented directly or via multiple STD encoders. The statistics generated by a space-time RAKE operation are as shown in the following Equations 17 and 18:

$$y = H^H r = Cs + H^H w \quad \text{Equation 17}$$

$$C = \begin{bmatrix} H_1^H H_1 & H_1^H H_2 & \ldots & H_1^H H_{P/2} \\ H_2^H H_1 & H_2^H H_2 & \ldots & H_2^H H_{P/2} \\ \vdots & \ddots & \vdots & \vdots \\ H_{P/2}^H H_1 & H_{P/2}^H H_2 & \ldots & H_{P/2}^H H_{P/2} \end{bmatrix} \quad \text{Equation 18}$$

Thus, the matrix C in Equation 18 is a P×P matrix that represents the effective space-time linear channel after space-time RAKE operation.

Some additional interesting structures of the matrix C from Equation 18 can be inferred from Equations 12 through 17. For example, with various analyses as may be confirmed by one skilled in the art, the relationships of the following Equations 19 through 22 may be shown, where Equation 19 describes the diagonal terms in the matrix C, Equation 20 describes the off-diagonal terms in the matrix C, and Equations 21 and 22 describe the specific elements in the off-diagonal terms shown in Equation 20:

$$H_k^H H_k = \left( \sum_{q=1}^Q |h_{q,2k-1}|^2 + |h_{q,2k}|^2 \right) \times \begin{bmatrix} 1 & 0 \\ 0 & 1 \end{bmatrix}, k = 1, 2, \ldots, P/2 \quad \text{Equation 19}$$

$$H_k^H H_l = \begin{bmatrix} a_{k,l} & b_{k,l} \\ -b_{k,l}^* & a_{k,l}^* \end{bmatrix}, k \neq l \quad \text{Equation 20}$$

$$a_{k,l} = \sum_{q=1}^Q h_{q,2k-1}^* h_{q,2l-1} + h_{q,2k} h_{q,2l}^* \quad \text{Equation 21}$$

$$b_{k,l} = \sum_{q=1}^Q -h_{q,2k-1}^* h_{q,2l} + h_{q,2k} h_{q,2l-1}^* \quad \text{Equation 22}$$

Equations 19 through 22 demonstrate that the matrix C consists of sub-blocks that are in STTD-encoded format. This is particularly evident by comparing the matrix in Equation 20 with the format of streams 3 and 4 described earlier. Given this observation, note further that typically STTD communications are non-linear because of the formation of complex conjugates by each STTD encoder $28_x$ thereby creating a non-linear effective channel as seen by the data. However, in the preferred embodiment, this non-linearity may be factored out at transmitter 12 and receiver 50. The linear component of the channel is represented by the matrix C in Equation 18. As a result, closed-loop signaling may be implemented, whereby based on the channel as detected by receiver 50, receiver 50 then provides control information to transmitter 12 via a wireless feedback channel so that from this information transmitter 12 may adjust the matrix V so as to compensate for the channel from transmitter 12 to receiver 50 and to thereby improve the SNR of its transmissions.

Figure 4:
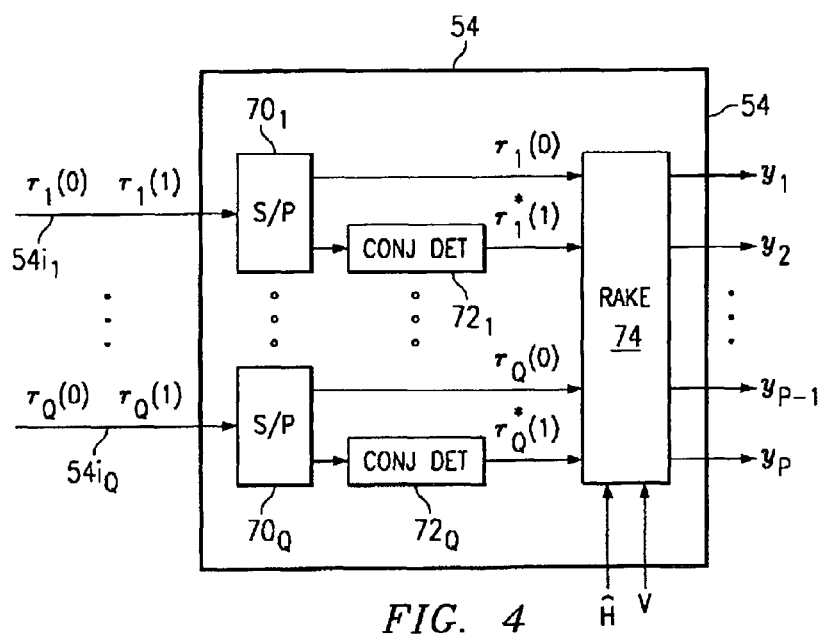
FIG. 4 illustrates an electrical and functional block diagram of the multiple STTD space-time combining block from FIG. 3.

FIG. 4 illustrates an electrical and functional block diagram of multiple STTD space-time combining block 54 from FIG. 3. As shown in FIG. 3, block 54 receives the values of $r_1$ through $r_Q$ and, further in response to the values of $\hat{H}$ and V, it performs STTD decoding and thereby determines the outputs $y_1$ through $y_p$. The additional detail in FIG. 4 facilitates a discussion of still additional details in these respects. Block 54 includes Q inputs $54i_1$ through $54i_Q$, each for receiving a respective value of $r_1$ through $r_Q$; further, recall that each value $r_x$ changes over different symbol time intervals n and, thus, for sake of discussion, FIG. 4 illustrates each input receiving values of $r_x$ at both (n=0) and (n=1). Each input $54i_x$ is connected to a corresponding serial-to-parallel converter $70_x$; thus, by way of examples, FIG. 4 illustrates input $54i_1$ connected to serial-to-parallel converter $70_1$ and input $54i_Q$ connected to serial-to-parallel converter $70_Q$. Each serial-to-parallel converter $70_x$ has a first output connected directly to a RAKE 74 and a second output connected to a respective complex conjugate determination block $72_x$. For example, serial-to-parallel converter $70_1$ has a first output connected directly to a RAKE 74 and a second output connected to a respective complex conjugate determination block $72_1$. Each complex conjugate determination block $72_x$ operates as its name suggests, that is, it determines the complex conjugate of its input and that conjugate is provided at its output. As a result of the preceding connections, one skilled in the art should appreciate that the first signal in a pair of signals output by serial-to-parallel converter $70_x$ is connected directly to RAKE 74, while the complex conjugate of the second signal in the pair of signals output by serial-to-parallel converter $70_x$ is connected to RAKE 74. For example, with respect to signals $r_1(0)$ and $r_1(1)$ input to serial-to-parallel converter $70_1$, the signal $r_1(0)$ is connected to RAKE 74 while the signal $r_1(1)$ is connected to RAKE 74. Thus, with respect to the latter signal, the formation of its complex conjugate generally reverses the effect of the formation of its complex conjugate in transmitter 12 by complex conjugate determination block $24_1$; in other words, the symbol data is returned to its original form. RAKE 74 then operates as known in the art to decode the effects of the STTD encoding, and in response to the values of $\hat{H}$ and V.

Returning now to discuss the matrix V in still additional detail, recall that the preferred embodiments contemplate either the determination of V in transmitter 12 or in receiver 50 and fed back to transmitter 12. For either device, the preferred embodiments also contemplate various alternative manners of forming the value for V. Each of these alternatives is discussed below.

As a first preferred embodiment for forming the values of V, the matrix values may be adaptive in the sense that a finite set of N possible such matrices $\{V^{(1)}, V^{(2)}, \ldots, V^{(N)}\}$ are established for a closed loop system, where at different times a different matrix $V^{(n)}$ is chosen from that finite set by the receiver and an indicator of that selection is fed back to the transmitter. For example, such a set could include matrices that each are created to perform a signal rotation in two-dimensional space when block 22 multiplies the selected matrix $V^{(n)}$ times its inputs, where each different matrix in the set corresponds to one or more different rotation values. As another example, such a set could include matrices that each are created to perform both a signal rotation in two-dimensional space and a phase change when block 22 multiplies the selected matrix $V^{(n)}$ times its inputs, where each different matrix in the set corresponds to one or more different rotation and/or phase change values. Still other examples may be ascertained by one skilled in the art. Indeed, for considerable additional detail in this regard, the reader is invited to review U.S. patent application Ser. No. 10/026,278, filed Dec. 18, 2001, entitled, "Closed Loop Multiple Transmit, Multiple Receive Antenna Wireless Communication System", and hereby incorporated herein by reference. As also described therein, the criteria at a given time for selecting a matrix once a set of matrices is established are preferably based on maximizing signal-to-interference-noise ratio or signal-to-noise ratio and also may be based on the type of interference cancellation technique implemented by the receiver. Finally, an alternative adaptive scheme may be used by selecting V from the set $$\left\{ \begin{bmatrix} I_2 \\ 0_{2\times 2} \end{bmatrix}, \begin{bmatrix} 0_{2\times 2} \\ I_2 \end{bmatrix} \right\}$$

according to the channel state, where the convention of $I_2$ is intended to designate the identity matrix of dimension 2×2 and the convention of $0_{2\times 2}$ is intended to designate a matrix with zeroes and of dimension 2×2. In this alternative, interference cancellation is not needed.

As an introduction to various additional preferred embodiments for the values of V, note that in general STTD-based approaches are non-linear and, hence, the concept of eigen-decomposition is meaningless. However, as discussed above, in the preferred embodiments the non-linearity is compensated at both transmitter 12 and receiver 50 through the use of alternating complex conjugate operations prior to STTD encoding. As a result, the linear component of the preferred embodiments is the channel matrix C, and eigenmode-based signaling can be accomplished by selecting V to be a matrix of complex numbers, and of dimension P×M, where the complex numbers are a subset of the eigenvectors of C and where recall that M is the number of inputs to block 22. In other words, because the matrix C is Hermitian symmetric and positive definite, it allows the eigendecomposition shown in the following Equation 23:

$$C = U \Lambda U^H \qquad \text{Equation 23}$$

Further according to the properties of eigenvalues, from Equation 23 the following Equations 24 and 25 may be stated:

$$\Lambda = \text{diag}\{\lambda_1, \lambda_2, \ldots, \lambda_P\}, \text{ where } \lambda_p > 0 \text{ is the } p^{th} \text{ eigenvalue} \qquad \text{Equation 24}$$

$$U^H U = I_P \qquad \text{Equation 25}$$

In Equation 25, the convention of $I_P$ is intended to designate the identity matrix of dimension P×P. Accordingly, in this preferred embodiment, the columns of V are chosen to be a subset of the columns of the P×P matrix U. Further, when $P \leq 8$, U and $\Lambda$ can be obtained in closed forms. For example, when P=4, from Equations 21 and 22 C may be stated as according to the following Equations 26 and 27:

$$C = \begin{bmatrix} c_1 & 0 & a & b \\ 0 & c_1 & -b^* & a^* \\ a^* & -b & c_2 & 0 \\ b^* & a & 0 & c_2 \end{bmatrix} \qquad \text{Equation 26}$$

$$\lambda = \frac{c_1 + c_2 \pm \sqrt{(c_1 - c_2)^2 + 4(|a|^2 + |b|^2)}}{2} \qquad \text{Equation 27}$$

In Equations 26 and 27, each eigenvalue has a multiplicity of two. For an arbitrary, and understood to be even, value of P, the eigenvectors and eigenvalues may be computed numerically. To do so, the following properties can be derived from Equations 21 and 22 and used to reduce the computation. First, there are at most P/2 distinct eigenvalues, and each eigenvalue is associated with two orthogonal eigenvectors. Second, when $v=[v_1, v_2, \ldots, v_{P-1}, v_P]^T$ is an eigenvector of C corresponding to an eigenvalue $\lambda$, then $\tilde{v}=[-v^*_2, v^*_1, \ldots, -v^*_P, v_{P-1}]$ is the other eigenvector corresponding to eigenvalue $\lambda$.

Given the preceding eigenmode discussion, maximum data rate can be obtained by utilizing all the eigenmodes to transmit different data streams. Since eigenmodes of C are orthogonal to one another, there is no interference across data streams. In this case, receiver 50 does not need to perform any interference cancellation due to the orthogonality in the transmitted streams. Further, to improve performance, power allocation across data streams may be used. For example, to reduce BER, more power may be allocated to the stream with the smaller eigenvalue to equalize the overall received power across all the streams. In yet another alternative, the two eigenmodes corresponding to the largest eigenvalue may be used to obtain maximum diversity gain. In this case, V is a P×2 matrix containing the two best eigenvectors of C.

Various additional preferred embodiments for the values of V can be formed in an open-loop manner, that is, where V is provided by transmitter 12 without the use of feedback from receiver 50. Four examples of such an approach are as follows. First, V can be an identity matrix of dimension P×P, in which case multiple STTD encoding alone is provided as in the above-incorporated U.S. patent application Ser. No. 10/107,275, with the present inventive teachings adding to that approach the function of forming complex conjugates of selected symbol samples prior to STTD encoding and reversing that effect when the corresponding signals are received. Second, regular STTD (i.e., non-multiple) can be obtained by choosing $$V = \begin{bmatrix} I_2 \\ 0_{(P-2)\times 2} \end{bmatrix},$$

thereby effectively eliminating the use of more than one STTD encoder. The position of $I_2$ can be anywhere. Third, a hybrid of STTD and orthogonal transmit diversity can be obtained by alternating the choice of V from the set $$\left\{ \begin{bmatrix} I_2 \\ I_2 \end{bmatrix}, \begin{bmatrix} I_2 \\ -I_2 \end{bmatrix} \right\}.$$

Fourth, a hybrid of STTD and time-switched transmit diversity for P=4 can be obtained by alternating the choice of V from the set $$\left\{ \begin{bmatrix} I_2 \\ 0_{2\times 2} \end{bmatrix}, \begin{bmatrix} 0_{2\times 2} \\ I_2 \end{bmatrix} \right\},$$

and one skilled in the art may extend this aspect to instances where P>4. For each of these last two options, the switching rate back and forth within the set as well as the switching pattern may be selected by one skilled in the art.

The preceding demonstrates various preferred embodiments that provide a multiple STTD wireless communication system that forms the complex conjugate of selected symbol samples prior to STTD encoding, and it reverses that process in the receiver. Further in this regard, note that the step of forming a complex conjugate of selected symbols has been shown in an explicit manner through the use of blocks 24$_x$, where the conjugate formation results in the symbol vector shown in Equation 11; however, note that the preferred embodiment of forming a complex conjugate also contemplates any other mathematical equivalent for realizing the complex conjugate, where such an equivalent may be achieved in other manners as may be ascertained by one skilled in the art. For example, in matrix format another manner of in effect forming the complex conjugate is through manipulation of the sign of the imaginary component of a number. For instance, consider for a complex number x the following principle of Equation 28 may be stated in matrix form regarding the number x and its complex conjugate:

$$\begin{bmatrix} x \\ x^* \end{bmatrix} = \begin{bmatrix} 1 & j \\ 1 & -j \end{bmatrix} \begin{bmatrix} x_R \\ x_I \end{bmatrix} \quad \text{Equation 28}$$

where, in Equation 28, $x_R$ is intended to depict the real component of x and $x_I$ is intended to depict the imaginary part of x. This same principle may be applied to the preceding Equations to demonstrate another manner of equivalently forming a complex conjugate. Specifically, consider Equations 9 through 12, re-written in the form of the following Equation 29 by simplifying in removing the value k and letting H indicate the general channel matrix, yielding the following:

$$\begin{bmatrix} r_0 \\ r_1^* \end{bmatrix} = H \begin{bmatrix} s_1 \\ s_2^* \end{bmatrix} \quad \text{Equation 29}$$

Further, each value s from Equation 29 also may be written in terms of its real and imaginary components, as shown in the following Equations 30 and 31:

$$s_1 = \begin{bmatrix} 1 & j \end{bmatrix} \begin{bmatrix} s_{1,R} \\ s_{1,I} \end{bmatrix} \quad \text{Equation 30}$$

$$s_2^* = \begin{bmatrix} 1 & -j \end{bmatrix} \begin{bmatrix} s_{2,R} \\ s_{2,I} \end{bmatrix} \quad \text{Equation 31}$$

Now, re-writing Equation 29 by substituting in the values for s of Equations 30 and 31 yields the following Equation 32:

$$\begin{bmatrix} r_0 \\ r_1^* \end{bmatrix} = H \begin{bmatrix} 1 & j & 0 & 0 \\ 0 & 0 & 1 & -j \end{bmatrix} \begin{bmatrix} s_{1,R} \\ s_{1,I} \\ s_{2,R} \\ s_{2,I} \end{bmatrix} \quad \text{Equation 32}$$

From Equation 32, let H times the 2×4 matrix that follows it be designated as $\tilde{H}$, then the following Equation 33 may be stated:

$$\begin{bmatrix} r_0 \\ r_1^* \end{bmatrix} = \tilde{H} \begin{bmatrix} s_{1,R} \\ s_{1,I} \\ s_{2,R} \\ s_{2,I} \end{bmatrix} \quad \text{Equation 33}$$

Further, Equation 33 may be expanded into a stacked form so as to include the complex conjugate of $$\begin{bmatrix} r_0 \\ r_1^* \end{bmatrix},$$

as shown in the following Equation 34:

$$\begin{bmatrix} r_0 \\ r_1^* \\ r_0^* \\ r_1 \end{bmatrix} = \begin{bmatrix} \tilde{H} \\ \tilde{H}^* \end{bmatrix} \begin{bmatrix} s_{1,R} \\ s_{1,I} \\ s_{2,R} \\ s_{2,I} \end{bmatrix} \quad \text{Equation 34}$$

Additionally, $r_0$ and $r_1$ (and their conjugates) can be written in expanded matrix form by separating their real and imaginary components, as in the following Equation 35:

$$\begin{bmatrix} r_0 \\ r_1^* \\ r_0^* \\ r_1 \end{bmatrix} = \begin{bmatrix} 1 & j & 0 & 0 \\ 0 & 0 & 1 & -j \\ 1 & -j & 0 & 0 \\ 0 & 0 & 1 & j \end{bmatrix} \begin{bmatrix} r_{0,R} \\ r_{0,I} \\ r_{1,R} \\ r_{1,I} \end{bmatrix} \quad \text{Equation 35}$$

Let the 4×4 matrix of Equation 35 be designated as T; then, substituting Equation 34 into Equation 35 yields the following Equation 36:

$$T \begin{bmatrix} r_{0,R} \\ r_{0,I} \\ r_{1,R} \\ r_{1,I} \end{bmatrix} = \begin{bmatrix} \tilde{H} \\ \tilde{H}^* \end{bmatrix} \begin{bmatrix} s_{1,R} \\ s_{1,I} \\ s_{2,R} \\ s_{2,I} \end{bmatrix} \quad \text{Equation 36}$$

From Equation 34, it may be observed that T is unitary and, thus, the following Equation 37 holds true:

$$T^H T = 2I \quad \text{Equation 37}$$

Lastly, multiplying both sides of Equation 36 by $\frac{1}{2}T^H$ yields the following Equation 38:

$$\begin{bmatrix} r_{0,R} \\ r_{0,I} \\ r_{1,R} \\ r_{1,I} \end{bmatrix} = \frac{1}{2} T^H \begin{bmatrix} \tilde{H} \\ \tilde{H}^* \end{bmatrix} \begin{bmatrix} s_{1,R} \\ s_{1,I} \\ s_{2,R} \\ s_{2,I} \end{bmatrix} \quad \text{Equation 38}$$

By letting the values $$\frac{1}{2} T^H \begin{bmatrix} \tilde{H} \\ \tilde{H}^* \end{bmatrix}$$

in Equation 38 equal to some transformation value A, then Equation 38 therefore demonstrates a relationship between the real and imaginary components of r and s, thereby in effect providing a mathematical equivalent to forming complex conjugates with explicitly doing so. Thus, such an approach as well as other equivalents are also within the intended scope of the preferred embodiment for forming a complex conjugate of selected symbols in the transmitter as well as reversing the conjugate of those selected symbols in the receiver.

Given the above, one skilled in the art should appreciate that the preferred embodiment operations permit an effective linear channel to be established, thereby further permitting another preferred aspect wherein a linear transformation may be made of the symbol samples also prior to STTD encoding. Further, the actual linear transformation may be chosen in various manner depending on various factors. Indeed, such linear transformation may include the use eigenmode transmission, whereas for prior art general STTD systems, eigenmode transmission is not permitted due to the inherent nonlinearity. As a result of the preceding alternatives, the preferred embodiments are able to achieve certain levels of performance with varying requirements for signal processing. Moreover, while the preferred embodiments have been functionally described, one skilled in the art may readily ascertain various physical manners of implementing these devices such as through numerous combinations of software and hardware, including the use of digital signal processors, application specific integrated circuits, and so forth. Further, while the preceding case has been shown for a single path as a preferred embodiment and for sake of facilitating the discussion, one skilled in the art may expand the present principles to accommodate the receipt of multipaths as well, that is, wherein the receiver receives and processes space time encoded signals in response to a channel effect that includes multipath propagation. Still further, while numerous examples have thus been provided, one skilled in the art should recognize that various modifications, substitutions, or alterations may be made to the described embodiments while still falling with the inventive scope as defined by the following claims.

The invention claimed is:

1. A wireless transmitter, comprising:
    circuitry for converting input bits to a plurality of symbols;
    circuitry for forming a complex conjugate of selected ones of the plurality of symbols, the selected ones corresponding to some and less than all the plurality of symbols;
    circuitry for producing each symbol at a symbol rate;
    circuitry for space time encoding both the selected ones of the plurality of symbols and non-selected ones of the plurality of symbols; and
    a plurality of transmit antennas coupled to transmit the space time encoded symbols at a rate greater than the symbol rate in response to the circuitry for space time encoding.

2. The transmitter of claim 1 and further comprising circuitry for transforming the symbols to form a respective plurality of transformed symbols, wherein the selected ones of the plurality of symbols and the non-selected ones of the plurality of symbols comprise transformed symbols.

3. The transmitter of claim 2:
    wherein the plurality of transmit antennas consists of an even number P of transmit antennas; and
    wherein the circuitry for space time encoding consists of a number P/2 of space time encoders, wherein each of the space time encoders is coupled to output space time encoded symbols to two of the P transmit antennas.

4. The transmitter of claim 3 wherein the selected ones of the respective plurality of transformed symbols consist of one-half of the respective plurality of transformed symbols.

5. The transmitter of claim 2 wherein the circuitry for transforming comprises eigenmode transforming circuitry.

6. The transmitter of claim 2 wherein the circuitry for transforming comprises circuitry for selecting a transformation matrix from a set of transformation matrices.

7. The transmitter of claim 6 wherein the circuitry for selecting a transformation matrix comprises open loop circuitry.

8. The transmitter of claim 7 wherein the transmitted symbols comprise code division multiple access signals transmitted in a time division duplex format.

9. The transmitter of claim 7 wherein the transmitted symbols comprise code division multiple access symbols transmitted in a frequency division duplex format.

10. The transmitter of claim 6 wherein the circuitry for selecting a transformation matrix selects the transformation matrix in response to closed loop feedback communications from a receiver.

11. The transmitter of claim 10 wherein the transmitted signals comprise code division multiple access symbols transmitted in a frequency division duplex format.

12. The transmitter of claim 2 wherein the circuitry for transforming comprises circuitry for performing a rotation on the symbols.

13. The transmitter of claim 2 wherein the circuitry for transforming comprises circuitry for performing a rotation and phase change on the symbols.

14. The transmitter of claim 2:
wherein the circuitry for transforming is for operating in response to a transformation matrix; and wherein the transformation matrix is selected from a set comprising $$\left\{ \begin{bmatrix} I_2 \\ 0_{2\times 2} \end{bmatrix}, \begin{bmatrix} 0_{2\times 2} \\ I_2 \end{bmatrix} \right\}.$$

15. The transmitter of claim 14 wherein the transformation matrix is selected from the set in response to closed loop feedback communications from a receiver.

16. The transmitter of claim 14 wherein the transformation matrix is selected from the set by alternating between $$\begin{bmatrix} I_2 \\ 0_{2\times 2} \end{bmatrix} \text{ and } \begin{bmatrix} 0_{2\times 2} \\ I_2 \end{bmatrix}$$

in the set.

17. The transmitter of claim 2:
wherein the circuitry for transforming is for operating in response to a transformation matrix; and wherein the transformation matrix is selected by alternating from a set comprising $$\left\{ \begin{bmatrix} I_2 \\ I_2 \end{bmatrix}, \begin{bmatrix} I_2 \\ -I_2 \end{bmatrix} \right\}.$$

18. The transmitter of claim 2 wherein the circuitry for space time encoding comprises circuitry for space time transmit diversity encoding.

19. The transmitter of claim 1 wherein the circuitry for space time encoding comprises circuitry for space time transmit diversity encoding.

20. The transmitter of claim 1 wherein the transmitted signals comprise code division multiple access symbols transmitted in a time division duplex format.

21. The transmitter of claim 1 wherein the transmitted signals comprise time division multiple access symbols transmitted in a time division duplex format.

22. A wireless transmitter, comprising:
circuitry for converting input bits to a plurality of symbols;
circuitry for forming a complex conjugate of selected ones of the plurality of symbols, the selected ones corresponding to some and less than all the plurality of symbols;
circuitry for producing each symbol at a symbol rate;
a number P/2 of space time encoders for space time encoding both the selected ones of the plurality of symbols and non-selected ones of the plurality of symbols;
circuitry for transforming the symbols to form a respective plurality of transformed symbols, wherein the selected ones of the plurality of symbols and the non-selected ones of the plurality of symbols comprise transformed symbols, wherein the selected ones of the respective plurality of transformed symbols consist of one-half of the respective plurality of transformed symbols;
wherein the circuitry for producing each symbol at a symbol rate comprises a plurality of parallel to serial converters, wherein each of the plurality of parallel to serial converters is for receiving in parallel one non-selected one of the respective plurality of transformed symbols and one selected one of the respective plurality of transformed symbols and for providing in a serial output to a respective one of the space time encoders the one non-selected one of the respective plurality of transformed symbols followed by the one selected one of the respective plurality of transformed symbols; and
a plurality of transmit antennas coupled to transmit the space time encoded symbols at a rate greater than the symbol rate in response to the circuitry for space time encoding, the plurality of transmit antennas comprising an even number P of transmit antennas, each of the space time encoders coupling output space time encoded symbols to two of the P transmit antennas.

23. The transmitter of claim 22 and further comprising spreading circuitry for spreading outputs from the space time encoding circuitry.

24. A wireless transmitter, comprising:
circuitry for converting input bits to a plurality of symbols;
circuitry for forming a complex conjugate of selected ones of the plurality of symbols, the selected ones corresponding to some and less than all the plurality of symbols;
circuitry for producing each symbol at a symbol rate;
circuitry for space time encoding both the selected ones of the plurality of symbols and non-selected ones of the plurality of symbols;
eigenmode transforming circuitry for transforming the symbols using all eigenmodes of an effective channel matrix, wherein the effective channel matrix relates to a channel effect between the transmitter and a receiver, to form a respective plurality of transformed symbols, wherein the selected ones of the plurality of symbols and the non-selected ones of the plurality of symbols comprise transformed symbols; and
a plurality of transmit antennas coupled to transmit the space time encoded symbols at a rate greater than the symbol rate in response to the circuitry for space time encoding.

25. A wireless transmitter, comprising:
circuitry for converting input bits to a plurality of symbols;
circuitry for forming a complex conjugate of selected ones of the plurality of symbols, the selected ones corresponding to some and less than all the plurality of symbols;
circuitry for producing each symbol at a symbol rate;
circuitry for space time encoding both the selected ones of the plurality of symbols and non-selected ones of the plurality of symbols;
eigenmode transforming circuitry is for transforming the symbols using a subset of eigenmodes of an effective channel matrix, wherein the effective channel matrix relates to a channel effect between the transmitter and a receiver, to form a respective plurality of transformed symbols, wherein the selected ones of the plurality of symbols and the non-selected ones of the plurality of symbols comprise transformed symbols; and
a plurality of transmit antennas coupled to transmit the space time encoded symbols at a rate greater than the symbol rate in response to the circuitry for space time encoding.

26. A wireless receiver, comprising:
a plurality of receive antennas coupled to receive a plurality of space time encoded signals transmitted by a transmitter at a data rate;
circuitry for estimating a channel effect between the transmitter and the receiver in response to pilot values in at least some of the received plurality of space time encoded signals;
circuitry for forming a complex conjugate of selected ones of signals corresponding to the received plurality of space time encoded signals, the selected ones consisting of some and less than all of the received plurality of space time encoded signals; and
circuitry for forming space time decoded signals at less than the data rate by space time decoding the received plurality of space time encoded signals in response to the channel effect.

27. The receiver of claim 26 and further comprising interference cancellation circuitry for removing interference effects in the space time decoded signals.

28. The receiver of claim 26 wherein the plurality of space time encoded signals comprise a plurality of spread space time encoded signals, and further comprising circuitry for despreading the plurality of spread space time encoded signals.

29. The receiver of claim 27:
wherein the space time encoded signals comprise a plurality of symbols;
wherein the transmitter comprises circuitry for transforming the plurality of symbols to form a respective plurality of transformed symbols; and
wherein the receiver further comprises:
circuitry for determining an indicator of a transformation matrix; and
circuitry for communicating the indicator to the transmitter via a wireless channel.

30. The receiver of claim 28 wherein the space time encoded signals comprise code division multiple access signals transmitted in a frequency division duplex format.

31. The receiver of claim 26 wherein the space time encoded signals comprise space time encoded signals in response to a channel effect that comprises multipath propagation.

32. A wireless system, comprising:
a wireless transmitter, comprising:
circuitry for converting input bits to a plurality of symbols;
circuitry for forming a complex conjugate of selected ones of the plurality of symbols, the selected ones consisting of some and less than all the plurality of symbols;
circuitry for producing each symbol at a symbol rate;
circuitry for space time encoding both the selected ones of the plurality of symbols and non-selected ones of the plurality of symbols; and
a plurality of transmit antennas coupled to transmit the space time encoded symbols at a rate greater than the symbol rate in response to the circuitry for space time encoding; and
a wireless receiver, comprising:
a plurality of receive antennas coupled to receive a plurality of space time encoded symbols transmitted by the transmitter;
circuitry for estimating a channel effect between the transmitter and the receiver in response to pilot values in at least some of the received plurality of space time encoded symbols;
circuitry for forming space time decoded symbols by space time decoding the received plurality of space time encoded symbols in response to the channel effect, and
wherein the circuitry for forming space time decoded symbols comprises circuitry for forming a complex conjugate of selected ones of the received plurality of space time encoded symbols, the selected ones consisting of some and less than all of the received plurality of space time encoded symbols.

33. A method of transmitting wireless signals, comprising:
converting input bits to a plurality of symbols;
forming a complex conjugate of selected ones of the plurality of symbols, the selected ones consisting of signals corresponding to some and less than all the plurality of symbols;
producing each symbol at a symbol rate;
space time encoding both the selected ones of the plurality of symbols and non-selected ones of the plurality of symbols; and
in response to the space time encoding step, transmitting the space time encoded symbols at a rate greater than the symbol rate along a plurality of transmit antennas.

34. The method of claim 33 and further comprising transforming the symbols to form a respective plurality of transformed symbols, wherein selected ones of the plurality of symbols and the non-selected ones of the plurality of symbols comprise transformed symbols.

35. The method of claim 34 wherein the transforming step comprises selecting a transformation matrix from a set of transformation matrices.

36. The method of claim 33 and further comprising spreading the space time encoded symbols.

37. The method of claim 33 wherein the transforming step comprises eigenmode transforming.

38. A method of processing signals in a wireless receiver, comprising:
receiving, along a plurality of receive antennas, a plurality of space time encoded signals transmitted by a transmitter at a data rate;
estimating a channel effect between the transmitter and the receiver in response to pilot values in at least some of the received plurality of space time encoded signals;
forming a complex conjugate of selected ones of signals corresponding to the received plurality of space time encoded signals, the selected ones consisting of some and less than all of the received plurality of space time encoded signals; and
forming space time decoded signals at less than the data rate by space time decoding the received plurality of space time encoded signals in response to the channel effect.

39. The method of claim 38 and further comprising performing interference cancellation for removing interference effects in the space time decoded signals.

40. The method of claim 38 wherein the plurality of space time encoded signals comprise a plurality of spread space time encoded signals, and further comprising despreading the plurality of spread space time encoded signals.

41. The method of claim 39:
wherein the space time encoded signals comprise a plurality of symbols;
wherein the transmitter comprises circuitry for transforming the plurality of symbols to form a respective plurality of transformed symbols; and
wherein the method further comprises:
determining an indicator of a transformation matrix; and
communicating the indicator to the transmitter via a wireless channel.

42. A wireless transmitter, comprising:
  circuitry for converting input bits to a plurality of symbols;
  circuitry for forming a complex conjugate of selected ones of the plurality of symbols, the selected ones consisting of some and less than all the plurality of symbols;
  circuitry for producing each symbol at a symbol rate;
  circuitry for space time encoding both the selected ones of the plurality of symbols and non-selected ones of the plurality of symbols; and
  a plurality of transmit antennas coupled to transmit the space time encoded symbols at a rate greater than the symbol rate in response to the circuitry for space time encoding.

43. A wireless receiver, comprising:
  a plurality of receive antennas coupled to receive a plurality of space time encoded symbols transmitted by a transmitter;
  circuitry for estimating a channel effect between the transmitter and the receiver in response to pilot values in at least some of the received plurality of space time encoded symbols;
  circuitry for forming space time decoded symbols by space time decoding the received plurality of space time encoded symbols in response to the channel effect, and
  wherein the circuitry for forming space time decoded symbols comprises circuitry for forming a complex conjugate of selected ones of the received plurality of space time encoded symbols, the selected ones consisting of some and less than all of the received plurality of space time encoded symbols.

* * * * *